(12) United States Patent
Manzella

(10) Patent No.: US 8,488,489 B2
(45) Date of Patent: Jul. 16, 2013

(54) SCALABLE PACKET-SWITCH

(75) Inventor: Joseph A. Manzella, Macungie, PA (US)

(73) Assignee: LSI Corporation, San Jose, CA (US)

( * ) Notice: Subject to any disclaimer, the term of this patent is extended or adjusted under 35 U.S.C. 154(b) by 88 days.

(21) Appl. No.: 12/485,164

(22) Filed: Jun. 16, 2009

(65) Prior Publication Data
US 2010/0316062 A1 Dec. 16, 2010

(51) Int. Cl.
H04L 12/28 (2006.01)

(52) U.S. Cl.
USPC .............................. 370/254; 370/396; 370/419

(58) Field of Classification Search
None
See application file for complete search history.

(56) References Cited

U.S. PATENT DOCUMENTS

| | | | | |
|---|---|---|---|---|
| 6,081,512 A * | 6/2000 | Muller et al. | | 370/256 |
| 6,424,621 B1 * | 7/2002 | Ramaswamy et al. | | 370/230 |
| 6,798,743 B1 * | 9/2004 | Ma et al. | | 370/235 |
| 2001/0046208 A1 * | 11/2001 | Eng et al. | | 370/229 |
| 2003/0185152 A1 * | 10/2003 | Nederveen et al. | | 370/229 |
| 2005/0076138 A1 * | 4/2005 | Sterne | | 709/238 |
| 2007/0081463 A1 * | 4/2007 | Bohra et al. | | 370/235 |
| 2008/0107109 A1 * | 5/2008 | Michaud | | 370/390 |
| 2009/0213868 A1 * | 8/2009 | Budhia et al. | | 370/419 |

* cited by examiner

Primary Examiner — Chirag Shah
Assistant Examiner — Daniel Mitchell
(74) Attorney, Agent, or Firm — Mendelsohn, Drucker & Associates, P.C.; David L. Cargile; Steve Mendelsohn

(57) ABSTRACT

A scalable packet switch possessing a multiport memory, a multiport memory manager, two or more input/output (I/O) ports, and two or more switch engines. Each switch engine is associated with one or more I/O ports, and is adapted to receive inbound packets and transmit outbound packets via the associated I/O ports. Inbound packets are stored in a shared packet buffer. Each switch engine is further adapted to (i) determine (i.e., bridge) the outbound I/O port(s) for received inbound packets by consulting a shared bridging table and (ii) schedule outbound packets for transmission, independently and in parallel with other switch engines. The shared packet buffer and shared bridging table are stored in the multiport memory and shared by all switch engines. The multiport memory manager allocates/de-allocates memory blocks within the multiport memory.

16 Claims, 9 Drawing Sheets

SCALABLE PACKET-SWITCH

BACKGROUND OF THE INVENTION

1. Field of the Invention

The invention relates to communications, specifically the routing of packets within digital communications networks.

2. Description of the Related Art

Digital communications networks, e.g., the Internet, rely upon the fast, efficient routing of packets from a source to a destination. The routing of packets is performed by, inter alia, a class of devices known as packet switches, or just switches. As digital communications networks spread throughout the world, and carry more traffic, there is an ever-present need for switches that can handle that increased traffic in a fast and cost-effective manner.

SUMMARY OF THE INVENTION

In certain embodiments, the invention is a packet switch comprising (i) two or more switch engines, (ii) two or more sets of one or more input/output (I/O) ports, each set of I/O ports connected to and associated with a corresponding switch engine, and (iii) one or more memory devices connected to the two or more switch engines. The one or more memory devices are adapted to store (i) egress task data for two or more sets of one or more egress task queues, each set of egress task queues associated with a corresponding switch engine, and (ii) packet data for packets received at the I/O ports and processed by the switch engines. The two or more switch engines are adapted to process packets in parallel. Furthermore, each switch engine performs (i) bridging of received packets using bridging logic local to the switch engine and (ii) scheduling of received packets for transmission using scheduling logic local to the switch engine.

In other embodiments, the invention is a communications system having a plurality of interconnected packet switches. At least one packet switch comprises (i) two or more switch engines, (ii) two or more sets of one or more input/output (I/O) ports, each set of I/O ports connected to and associated with a corresponding switch engine, and (iii) one or more memory devices connected to the two or more switch engines. The one or more memory devices are adapted to store (i) egress task data for two or more sets of one or more egress task queues, each set of egress task queues associated with a corresponding switch engine, and (ii) packet data for packets received at the I/O ports and processed by the switch engines. The two or more switch engines are adapted to process packets in parallel. Furthermore, each switch engine performs (i) bridging of received packets using bridging logic local to the switch engine and (ii) scheduling of received packets for transmission using scheduling logic local to the switch engine.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

On a packet-switched network such as the Internet, traffic between a source and a destination is in the form of one or more discrete units, known as packets. The processing of packets at a network node is typically performed by a number of software protocols working in coordination. These protocols are typically visualized as a vertical stack of layers. Each protocol layer accepts a packet from an adjacent protocol layer, processes the packet, and then delivers the resulting packet to the next protocol layer in the stack. The Internet is typically described using a five-layer protocol stack.

Figure 1:
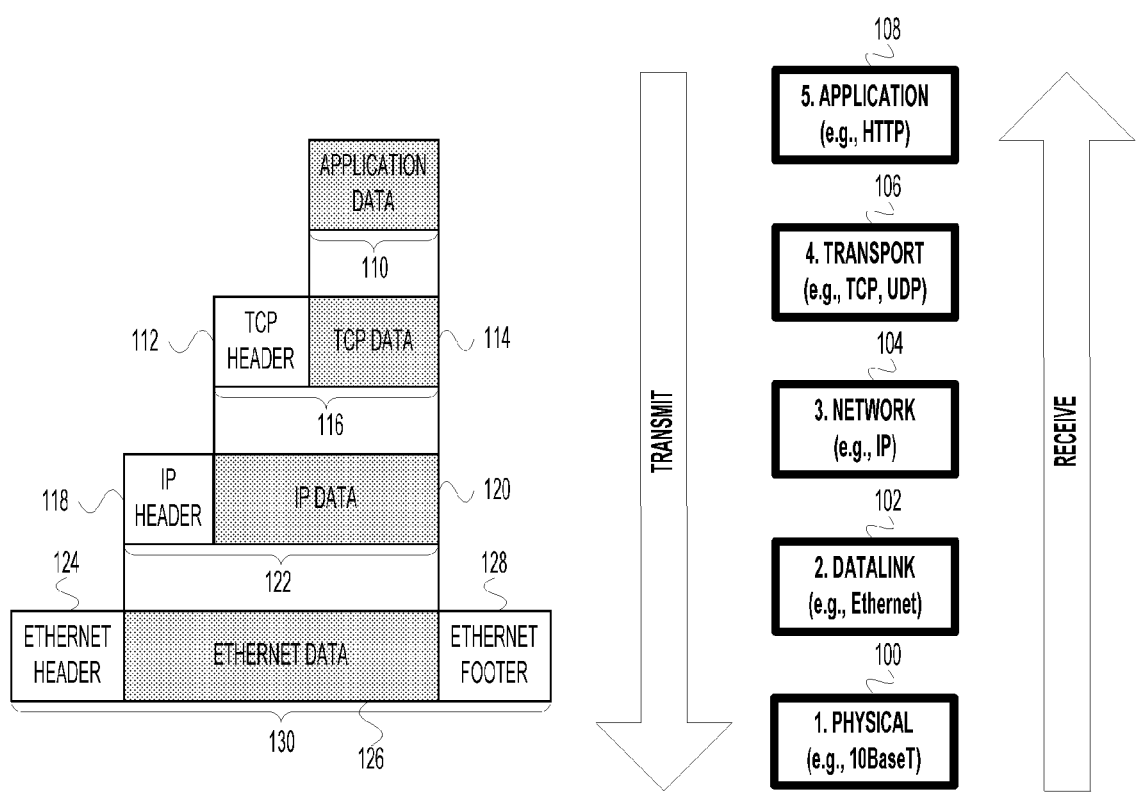
FIG. 1 is a graphical depiction of the five-layer protocol stack of the Internet.

FIG. 1 is a graphical depiction of the five-layer protocol stack of the Internet. By convention, protocol layers are numbered from bottom to top, with physical layer 100 being first, datalink layer 102 second, network layer 104 third, transport layer 106 fourth, and application layer 108 fifth and last.

In the transmit direction (from the top down), application layer 108 outputs application data 110 to transport layer 106 (e.g., Terminal Control Protocol, or TCP), where the application data 110 becomes TCP data 114. Transport layer 106 prepends TCP header 112 to TCP data 114, and sends the resulting TCP packet 116 to network layer 104 (e.g., Internet Protocol, or IP), where packet 116 becomes IP data 120. Network layer 104 prepends IP header 118 to IP data 120 and sends the resulting IP packet 122 to datalink layer 102 (e.g., Ethernet), where IP packet 122 becomes Ethernet data 126. Datalink layer 102 prepends Ethernet header 124 and appends Ethernet footer 128 to Ethernet data 126, and sends the resulting Ethernet packet 130 to physical layer 100 (e.g., 10BaseT) for transmission over a physical medium (e.g., copper wire, optical fiber, air).

TCP header 112, IP header 118, and Ethernet header 124 comprise, inter alia, source and destination address information. Various devices in a network (e.g., switches, routers) use source and destination address information to route a packet to its destination. At an Ethernet datalink layer 102, the addresses correspond to medium access control (MAC) devices, i.e., physical transceiver devices that terminate a physical medium. For example, a 10BaseT Ethernet cable, a typical physical medium, connects two transceivers, e.g., the Ethernet transceiver on a computer to the Ethernet transceiver on another computer. Each of those transceivers has a MAC address. Likewise, the IEEE 802.11b "Wi-Fi" wireless network adapter card on a laptop has a MAC address, as does the wireless access-point/router with which it communicates. A wireless access-point/router is a device that allows multiple wireless devices to share a single connection to a network. In this example, the physical medium is air.

Figure 2:
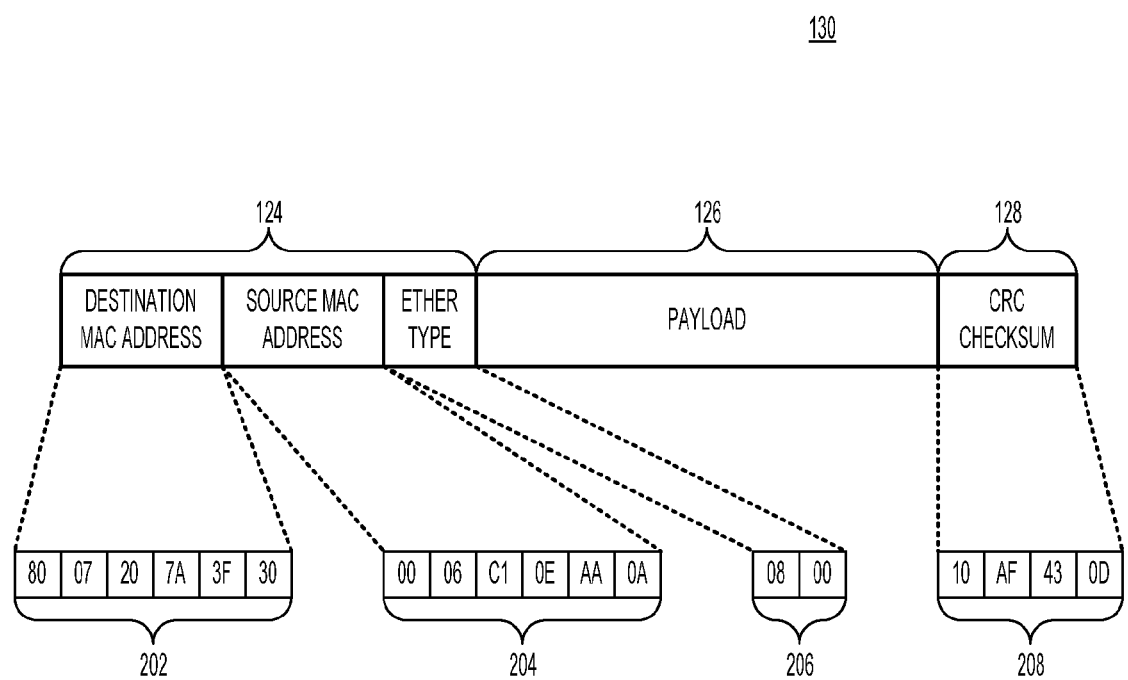
FIG. 2 is a diagram of Ethernet packet 130 of FIG. 1.

FIG. 2 is a diagram of Ethernet packet 130 of FIG. 1. Ethernet packet 130 comprises (i) Ethernet header 124, (ii) Ethernet payload 126, and (iii) Ethernet footer 128. Ethernet header 124 comprises three fields: 6-byte destination MAC address field 202, 6-byte source MAC address field 204, and 2-byte Ethernet type field 206. A MAC address is typically represented as a 12-digit hexadecimal string, e.g., 00051ACF006D. Ethernet footer 128 comprises a single 4-byte cyclic redundancy check (CRC) field 208. The CRC value is used for error detection.

An Ethernet switch is a device that receives an Ethernet packet and attempts to route the packet to the destination MAC address contained in the packet's Ethernet header.

Figure 3:
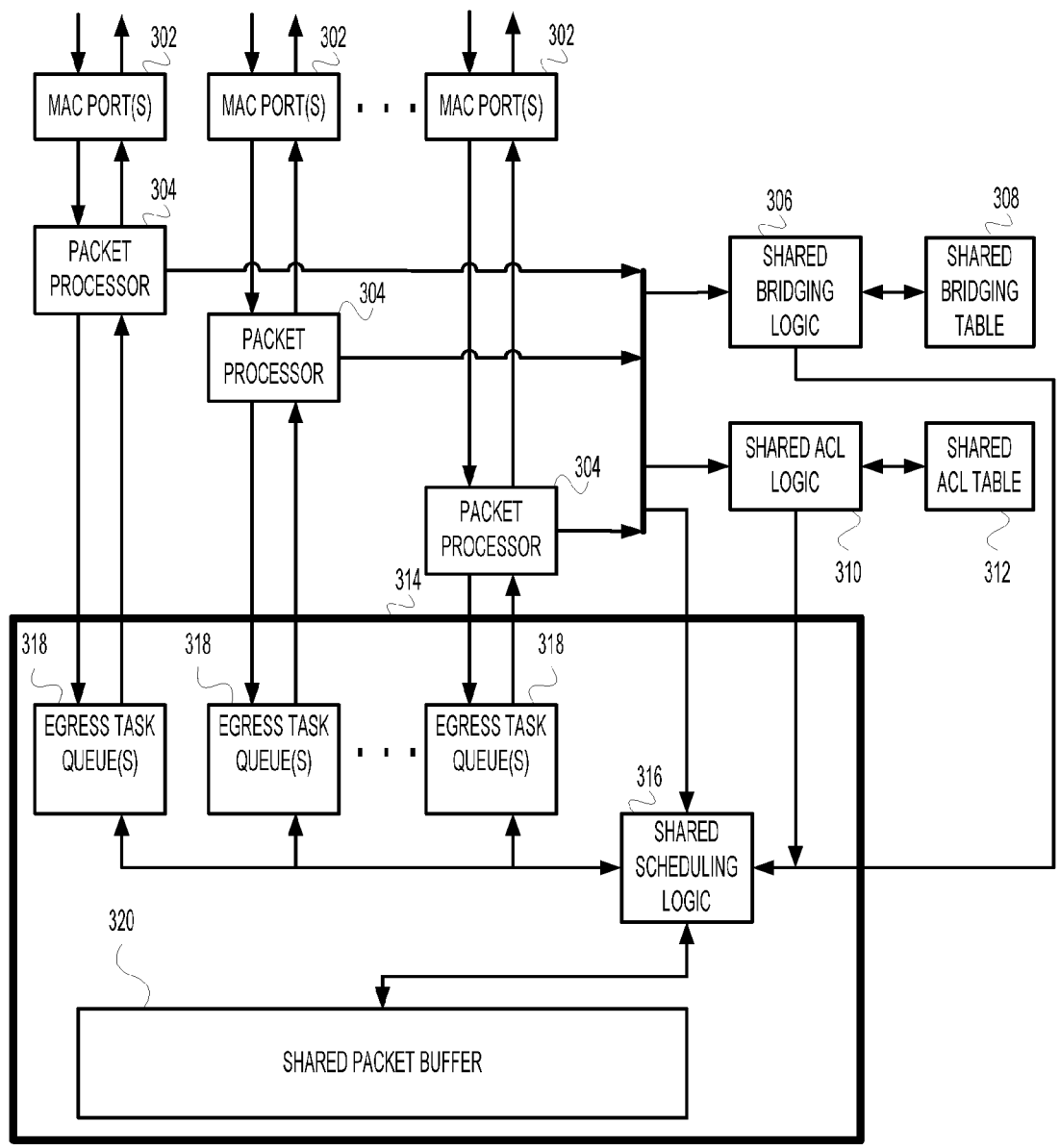
FIG. 3 is a block diagram of a conventional Ethernet switch 300.

FIG. 3 is a block diagram of a conventional Ethernet switch 300. Switch 300 comprises one or more MAC ports 302, one or more corresponding packet processors 304, shared bridging logic 306, shared bridging table 308, shared access control list (ACL) logic 310, shared ACL table 312, and packet storage module 314. A shared resource (e.g., shared bridging table 308) is a single resource which is shared by two or more other modules (e.g., packet processors 304) in the switch. Package storage module 314 comprises shared scheduling logic 316, one or more egress task queues 318, and shared packet buffer 320.

Figure 4:
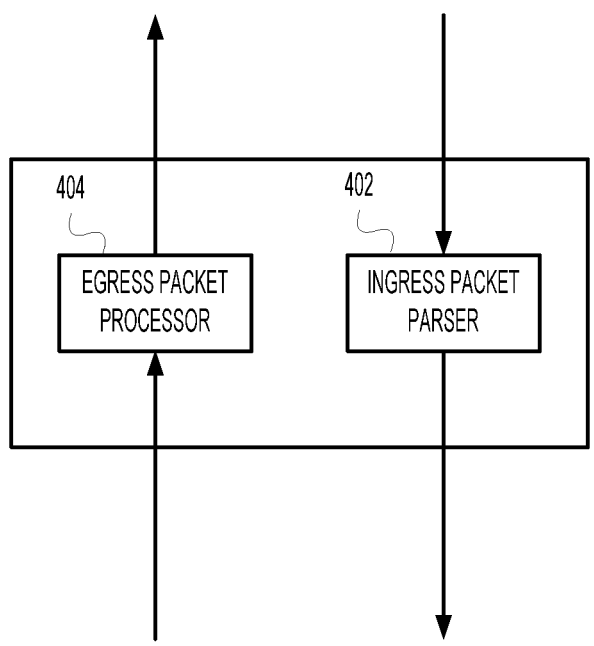
FIG. 4 is a block diagram of each packet processor 304 of FIG. 3.

FIG. 4 is a block diagram of each packet processor 304 of FIG. 3. Packet processor 304 comprises ingress packet parser 402, and egress packet processor 404.

Switch 300 sends packets to, and receives packets from, other devices via MAC ports 302. Each MAC port 302 comprises a physical port (e.g., an RJ45 jack) and an associated Ethernet transceiver (not shown). Each MAC port 302 has an identification number (ID) that uniquely identifies that MAC port within switch 300. Each MAC port 302 can be viewed as comprising two logical ports: a receive port and a send port. For sending packets, multiple send ports can be bound together to form a single logical port known as a send-port aggregate. When a packet is sent by a send-port aggregate, it is actually sent by the first available member send port of the send-port aggregate.

Figure 5:
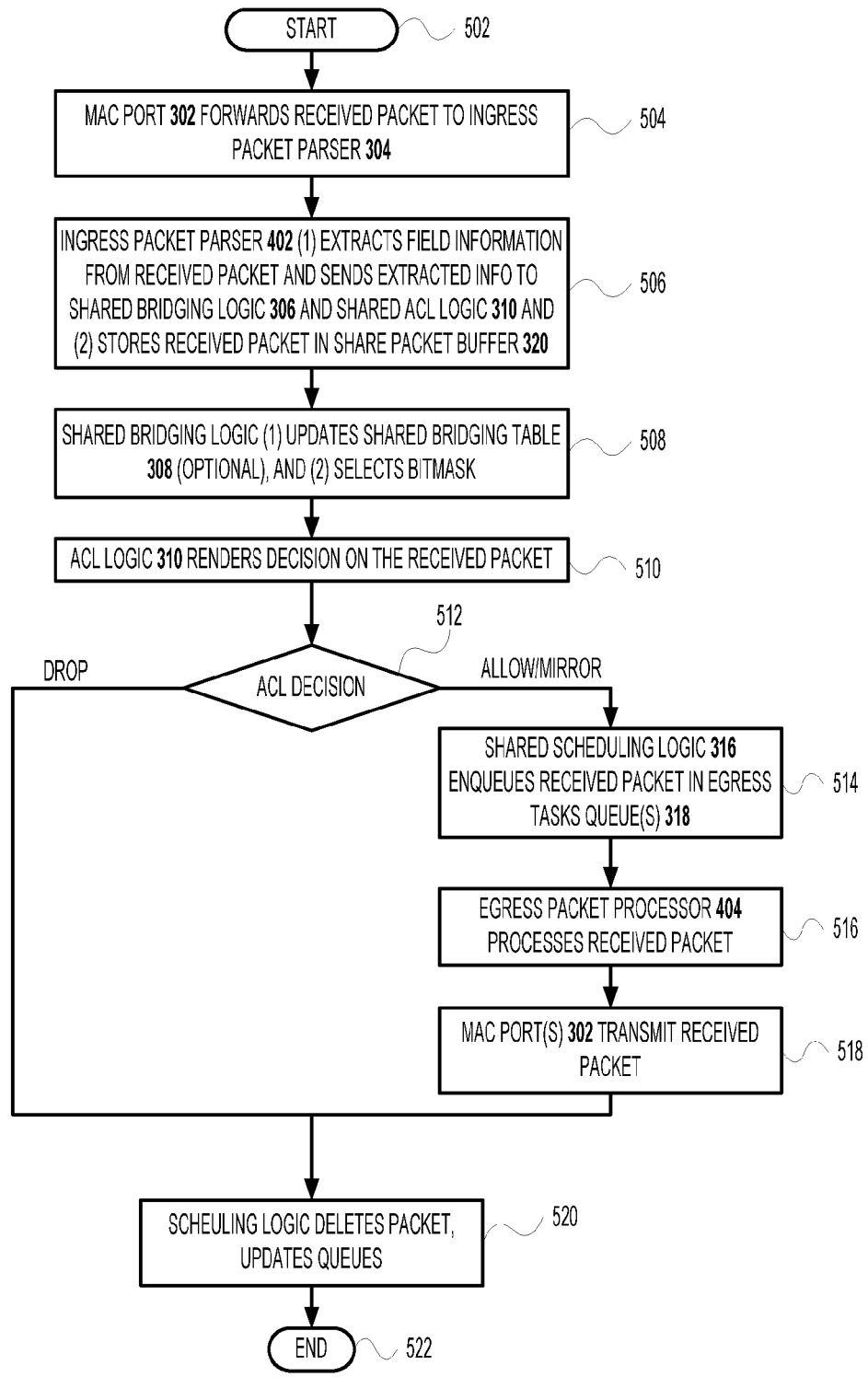
FIG. 5 is a flowchart of switching process 500 performed by switch 300 of FIG. 3.

FIG. 5 is a flowchart of switching process 500 performed by switch 300 of FIG. 3. Processing starts at step 502 and continues to step 504, where MAC port 302 receives an Ethernet packet, i.e., the received packet, and forwards the received packet to packet processor 304. Next, in step 506, ingress packet parser 402 within packet processor 304 extracts various information from the received packet, e.g., source MAC address 204, destination MAC address 202, source IP address, destination IP address, source TCP port, destination TCP port, virtual local-area-network (VLAN) tags, etc. The ingress packet parser (i) relays (a) the extracted field values and (b) the ID of the MAC port that received the received packet to shared bridging logic 306 and shared ACL logic 310, and (ii) relays the received packet to shared packet buffer 320, where the received packet is stored pending further processing.

Shared bridging logic 306 writes to and reads from shared bridging table 308. The shared bridging table comprises any number of subtables, wherein each subtable comprises any number of records. Each record associates a MAC address with a bitmask. The bitmask is a string of bits, wherein each bit corresponds to a different send port or send-port aggregate. The 1s in the bitmask indicate which send port(s)/send-port aggregate(s) (i.e., selected transmit ports) ought to transmit the received packet.

At step 508, shared bridging logic 306 performs two tasks. First, the shared bridging logic searches shared bridging table 308 for a record that matches the source MAC address field of the received packet and any other fields that may be used for bridging such as VLAN tags. Specifically, the shared bridging logic concatenates the selected fields and hashes the concatenation to yield a hash value. Then, the shared bridging logic locates the bridging subtable matching the hash value. Once the matching subtable is located, the matching record within the selected subtable is selected. If there does not exist a matching record in the shared bridging table, then the shared bridging logic adds a new record associating the fields with the received port. If there is insufficient free space within shared bridging table CE to add the new record, then the shared bridging logic deletes the least recently accessed shared bridging table record(s) until sufficient space is made for the new record. If a matching record does exist, then the port in the record is updated to the received port. It is through this process that the switch "learns" various routes and adds/modifies those routes to the shared bridge table.

Second, the shared bridging logic searches the shared bridging table for an entry matching the destination MAC address of the received packet. If a matching record is found, then the shared bridging logic retrieves the corresponding bitmask. If a matching record is not found in shared bridging table, then the shared bridging logic selects a default bitmask known as a flood mask. A typical flood mask contains a bit value of 1 for every MAC port/port aggregate in the switch except the MAC port that received the received packet.

Shared ACL logic 310 reads from and writes to shared ACL table 312. The shared ACL table comprises any number of records, each of which associates a value or range of values with a decision, the decision typically being one of (i) drop, i.e., delete the received packet and take no further action, (ii) allow, i.e., process and transmit the received packet, and (iii) mirror, which is similar to allow, but also transmits the received packet out one or more special MAC ports for monitoring purposes. The value or range of values may be, e.g., MAC addresses, IP addresses, or TCP ports. At step 510, the shared ACL logic searches the shared ACL table using the extracted data sent by ingress packet parser 402 and renders a drop/allow/mirror decision. The drop/allow/mirror decision is communicated to shared scheduling logic 316 along with the bitmask selected in step 508.

If, at step 512, the ACL decision is drop, then, at step 520, (i) the received packet is deleted from the shared packet buffer by shared scheduling logic 316, (ii) queues are updated, and (iii) processing terminates at step 522. If, instead, at step 512, the decision is allow or mirror, then, at step 514, shared scheduling logic 316 enqueues the received packet to the egress task queue(s) 318 of the MAC port(s) indicated by the bitmask. The process of rendering an ACL decision and processing a received packet in accordance with the ACL decision is known as ACL filtering.

A single MAC port typically has multiple egress task queues, wherein each queue represents a different packet class (e.g., high-priority, low-priority). An egress task queue typically is associated with one and only one MAC port. When a packet is enqueued to a particular MAC port, it is enqueued in only one of the egress task queues associated with that MAC port.

Next, at step 516, egress packet processor 404 within pack processor 304 processes (e.g., inserts VLAN tags) the received packet for transmission. Next, at step 518, one or more MAC port(s) 302 transmit the received packet. When transmission is complete, at step 520, the received packet is deleted from the shared packet buffer by shared scheduling logic CH, queues are updated, and processing terminates at step 522.

In addition to participating in switching process 500, shared bridging logic 306 also performs background aging of records in the shared bridging table. The shared bridging logic periodically scans the records of the shared bridging table and deletes records that match one or more criteria, e.g., records that have not be accessed within the last x seconds, where x is a pre-defined threshold.

A disadvantage of the architecture of switch 300 of FIG. 3 is that certain critical operations (e.g., bridging-table lookups/updates, ACL-table lookups, enqueuing of packets for transmission) are performed by shared, centralized resources, e.g., shared bridging logic 306, shared ACL logic 310, shared scheduling logic 316. Thus, the logic and associated resources are typically designed for a specific switch throughput. For example, the shared bridging/ACL/scheduling logic and associated shared tables for a switch capable of transmitting and receiving 10 gigabits per second (10 Gb) are fundamentally different from the corresponding logic and associated resources for a 100 Gb switch. In other words, the logic and resources for a 100 Gb switch are not merely ten times the logic/resources of a 10 Gb switch. In yet other words, the architecture of switch 300 is not scalable, but must be re-designed for different throughput scenarios.

Embodiments of the present invention are scalable packet switches. The switches comprise a multiport memory connected to two or more switch engines. Each switch engine supports one or more MAC ports. Each switch engine comprises various logic modules (e.g., bridging logic, ACL logic, scheduling logic) and stores data associated with those logic modules (e.g., bridging table entries, ACL table entries, received packets) either in the multiport memory or in memory local to the switch engine. The two or more switch engines are connected to each other via an engine communication ring.

Each switch engine independently and in parallel performs critical operations such as making bridging decisions, rendering ACL decisions, and scheduling packets for transmission. As such, there are fewer centralized logic modules and associated resources. Thus, designing a switch that can handle a specific throughput value requires less re-engineering, and typically involves little more than (1) including the requisite number of switch engines and (2) increasing the multiport memory to the requisite size.

Figure 6:
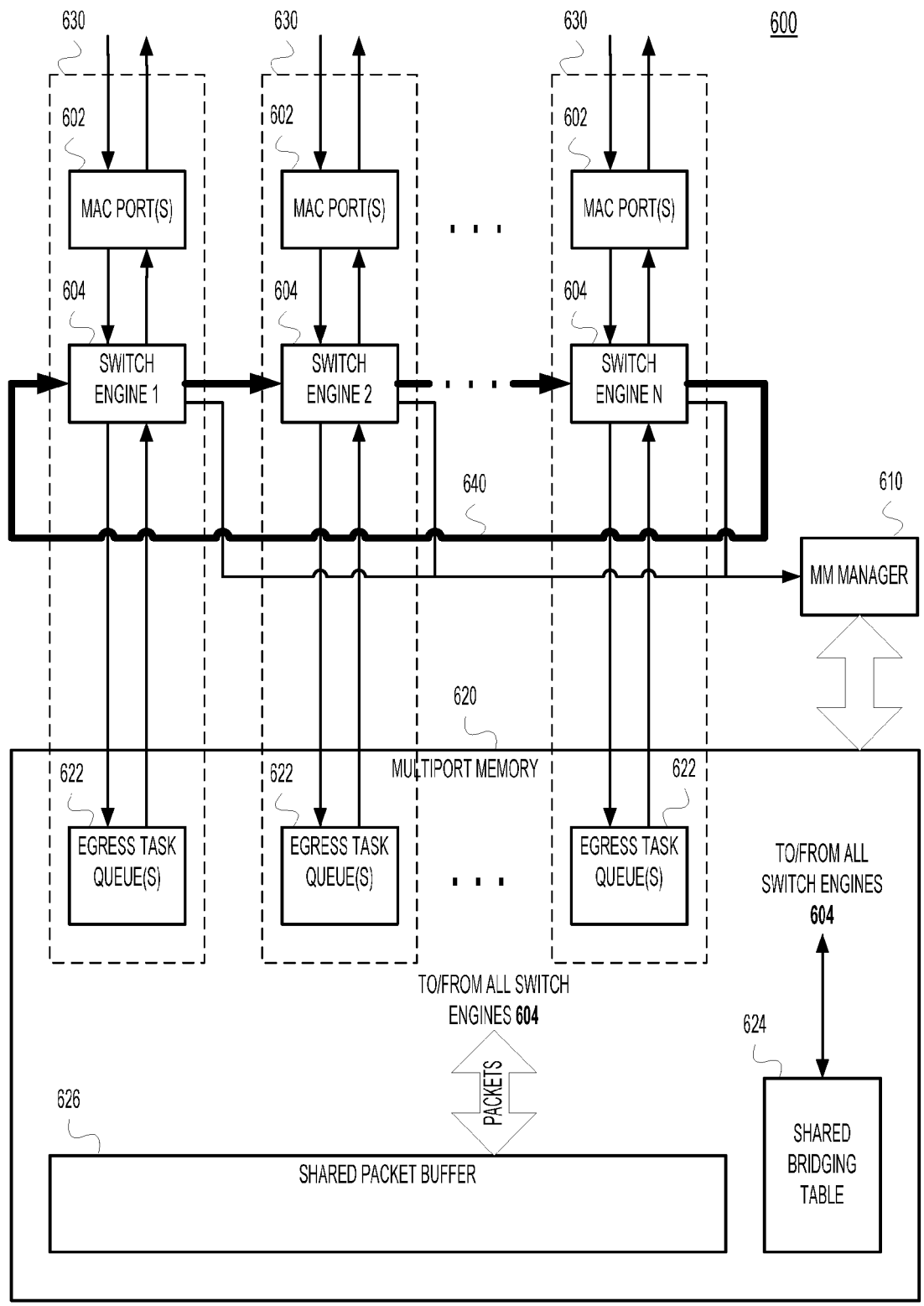
FIG. 6 is a block diagram of Ethernet switch 600 according to one embodiment of the present invention.

FIG. 6 is a block diagram of Ethernet switch 600 according to one embodiment of the present invention. Switch 600 comprises two or more MAC ports 602, two or more corresponding switch engines 604, a multiport memory (MM) manager 610, and multiport memory 620. Multiport memory 620 comprises shared bridging table 624, shared packet buffer 626, and two or more egress task queues 622. MAC ports 602, shared bridging table 624, shared packet buffer 626, and egress task queues 622 are analogous to MAC ports 302, shared bridging 308, shared packet buffer 320, and egress task queues 318 of FIG. 3, respectively.

Any number of MAC ports 602 may be connected to a single switch engine 604. There are typically multiple egress task queues 622 per switch engine 604, one queue per packet class. Each switch engine 604, along with its associated MAC port(s) 603 and associated egress task queue(s) 622 form a channel block 630. Switch engines 604 communicate with each other via engine communication ring 640.

Figure 7:
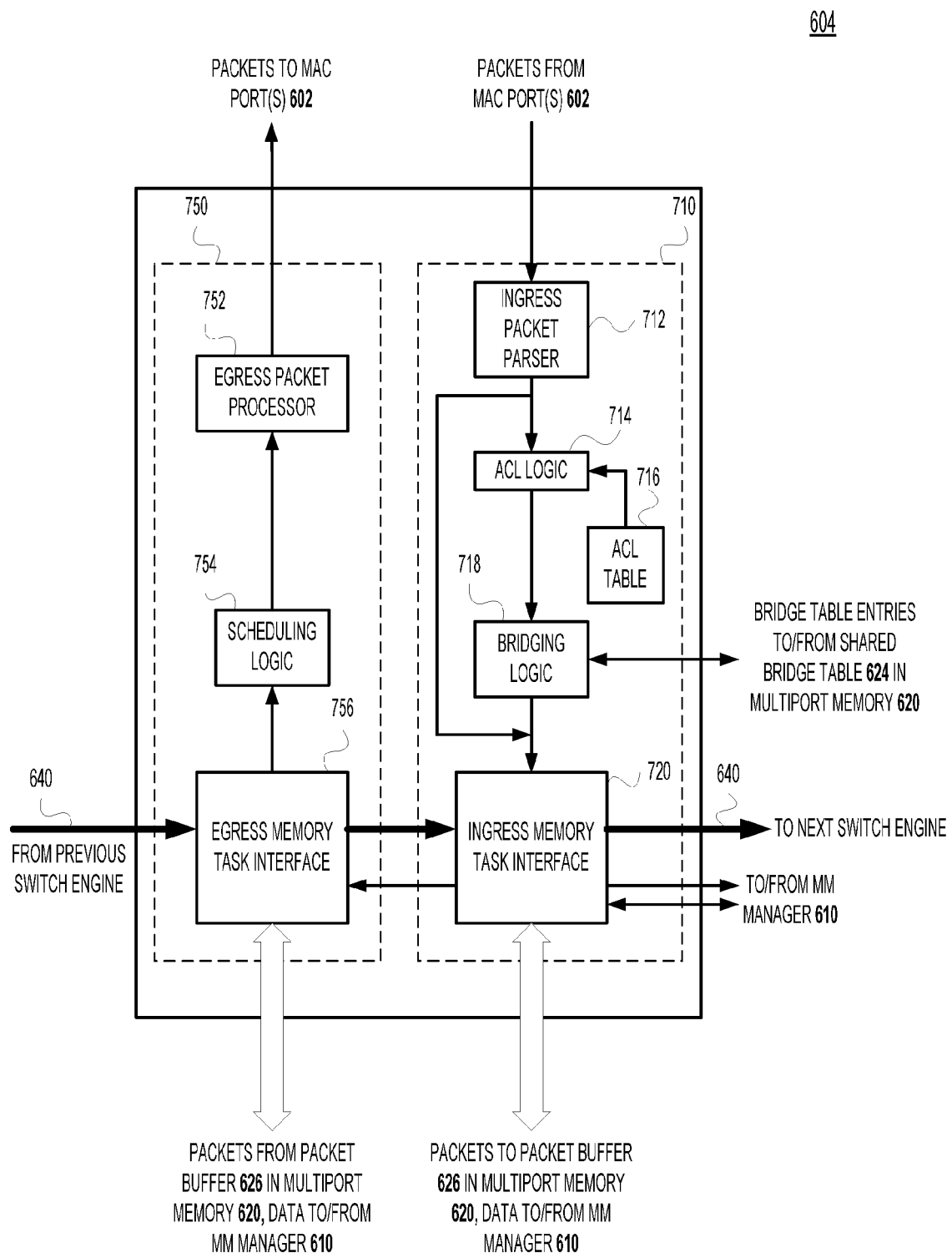
FIG. 7 is a block diagram of each switch engine 604 of FIG. 6 according to one embodiment of the present invention.

FIG. 7 is a block diagram of each switch engine 604 of FIG. 6 according to one embodiment of the present invention. Switch engine 604 comprises two "slices": egress slice 750 and ingress slice 710.

Ingress slice 710 comprises ingress packet parser 712, ACL logic 714, ACL table 716, bridging logic 718, and ingress memory task interface 720. Ingress slice 710 (i) receives received packets from MAC port(s) 602, (ii) sends/receives data to/from other switch engines 604 via engine communication ring 640, (iii) sends/receives data to/from MM manager 610, and (iv) sends/receives data to/from multiport memory 620. Ingress packet parser 712 is analogous to ingress packet parser 402 of FIG. 4. ACL logic 714, ACL table 716, and bridging logic 718 are analogous to shared ACL logic 310, shared ACL table 312, and shared bridging logic 306, except that the resources in FIG. 7 are not shared. Instead, each switch engine 604 possesses/executes its own set of these resources.

Egress slice 750 comprises egress packet processor 752, scheduling logic 754, and egress memory task interface 756. Egress slice 750 (i) sends packets to MAC module(s) 602, (ii) sends/receives data to/from other switch engines 604 via engine communication ring 640, (iii) sends/receives data to/from MM manager 610, and (iv) sends/receives data to/from multiport memory 620.

Shared scheduling logic 306 of FIG. 3 performs a number of operations, including: adding tasks to egress task queues; deciding, for the entire switch, the next task to be handled (i.e., the next packet to be transmitted); reading a packet from the shared packet buffer and relaying the packet to the outbound packet process; and updating the egress task and shared packet buffer when transmission is complete. In contrast, in certain embodiments of the present invention, the only action performed by scheduling logic 754 is to determine, from among the egress task queues 622 associated with switch engine 604, the next task to be processed by egress slice 710.

Referring again to FIG. 6, MM manager 610 manages multiport memory 620. Specifically, when a switch is initialized, the MM manager creates a "free" list of all memory blocks available in the multiport memory. When other elements in the switch need to store packets in the multiport memory, those elements request memory from the MM manager. The MM manager allocates the blocks, and moves those blocks from the free list to a used list. Also, the MM manager creates an allocation counter for the allocated blocks, and sets the allocation counter to the number of ports that will transmit the stored packet. When a port transmits the stored packet, the allocation counter is decremented. When the counter is 0, the blocks are de-allocated, i.e., moved from the used list back to the free list.

Figure 8:
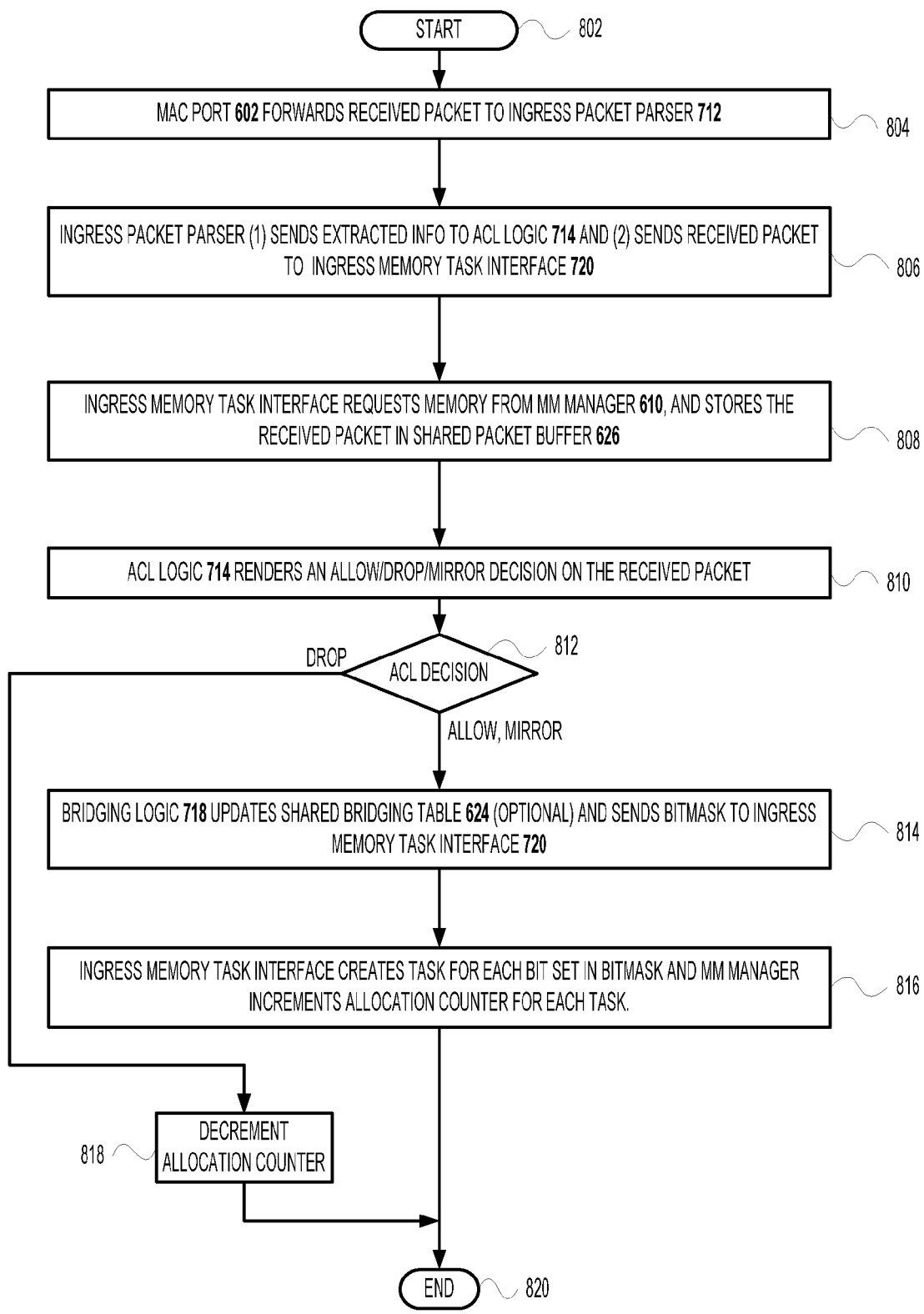
FIG. 8 is a flowchart of ingress process 800 according to certain embodiments of the present invention.

FIG. 8 is a flowchart of ingress process 800 according to certain embodiments of the present invention. Ingress process 800 is executed by ingress slice 710 of FIG. 7 upon receipt of a new packet.

Processing begins at step 802 and proceeds to step 804, where MAC port 602 forwards the received packet to ingress packet parser 712. Next, at step 806, the ingress packet parser (1) extracts information from the received packet and sends the extracted information to ACL logic 714 and (2) sends the received packet to ingress memory task interface 720 for storage in shared packet buffer 626 of FIG. 6.

Next, at step 808, the ingress memory task interface requests the appropriate amount of storage from MM manager 610. The MM manager allocates the memory and sets the allocation counter for the allocated memory to 1. The memory task interface stores the received packet in the allocated memory.

Next, at step 810, ACL filtering is performed. Specifically, ACL logic 714 consults ACL table 716 and renders an drop/allow/mirror decision for the received packet. If, at step 812, the ACL decision is drop, then, at step 818, MM manager 610 decrements the allocation counter for the allocated memory by 1, setting the allocation counter to 0, i.e., deallocating the memory.

If, on the other hand, the ACL decision at step 812 is allow or mirror, then, at step 814, the extracted information is forwarded to bridging logic 718. As described above in the discussion of step 508 of FIG. 5, bridging logic 718 hashes selected values (e.g., source MAC address, VLAN tag) from the received packet and searches shared bridging table 624 for a record that matches the source MAC address. If no matching record is found, then the bridging logic adds a new record to the shared bridging table with information on the receive port, deleting least recently accessed records, if required, to free up space in the bridging table. If the entry exists and needs the destination port updated, then the entry is updated.

Bridging logic 718 also searches the shared bridging table for an entry matching the destination MAC address of the received packet. If a match is found, then the bridging logic forwards the bitmask stored in the matching entry to ingress memory task interface 720. If a match is not found, then the bridging logic forwards a pre-defined flood mask to the ingress memory task interface. The bitmask tells the ingress memory task interface which ports will transmit the received packet.

Next, at step 816, ingress memory task interface 720 creates one or more tasks for the received packet. One task is created for each bit set in the bitmask. Specifically, the ingress memory task interface, via engine communication ring 640, contacts the egress memory task interface 756 of each egress slice 750 that will transmit the received packet. Each egress memory task interface responds with the starting and ending addresses of the appropriate egress task queue(s) 622. The ingress memory task interface adds a task to the tail of the appropriate egress task queue(s). For each task created, the ingress memory task interface instructs MM manager 610 to increment the allocation counter associated with the received packet.

A typical task includes (i) the starting address of the packet in shared packet buffer 626 and (ii) the packet length. The task may also contain some or all of the packet data (for smaller-size packets, i.e., packets with fewer than 96 bytes of data, the data can be included in the task); in some cases, the packet data may be split into multiple smaller chunks of data.

Process 800 then terminates at step 820.

Bridging logic 718 of channel block 630 also performs background aging of records in shared bridging table 724. Unlike shared bridging logic 306 of prior-art switch 300, that aged all records in shared bridging table 308, each bridging logic 718 might perform background aging of only a subset of the records in the shared bridging table. For example, if switch 600 of FIG. 6 comprises five switch engines, and, hence, five bridging logic modules 718, then each bridging logic module might be responsible for aging a fifth of the records in shared bridging table 624.

Figure 9:
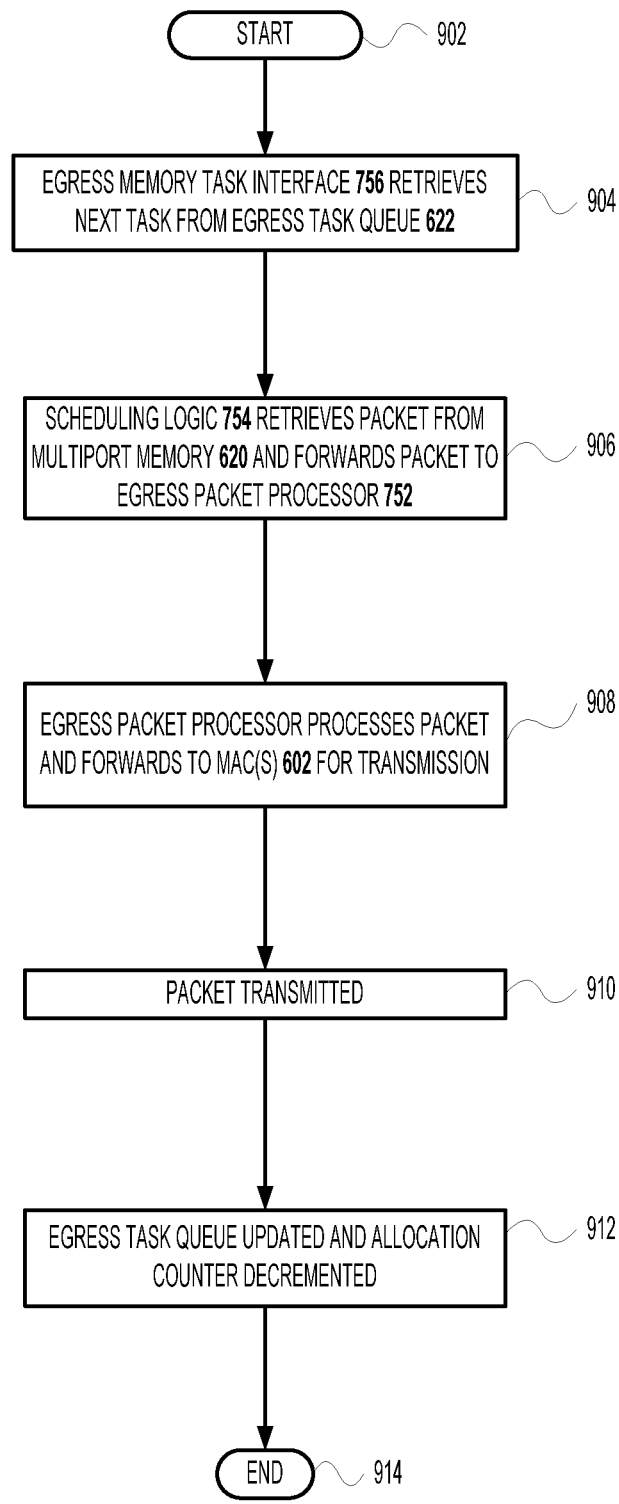
FIG. 9 is a flowchart of egress process 900 according to certain embodiments of the present invention.

FIG. 9 is a flowchart of egress process 900 according to certain embodiments of the present invention. Egress process 900 is executed by egress slice 750 of FIG. 7.

Processing begins at step 902 and proceeds to step 904, where egress memory task interface 756 retrieves the next task from its corresponding set of egress task queues 622 of FIG. 6. Then, at step 906, using the task information, scheduling logic 754 retrieves the stored packet from shared packet buffer 626 via the egress memory task interface, and forwards that packet to egress packet processor 752.

Next, at step 908, the egress packet processor processes the packet (e.g., inserts VLAN tags or other field modification if desired) and forwards the processed packet to MAC port(s) 602 for transmission. Then, at step 910, the packet is transmitted by one or more MAC port(s). Once transmission is complete, then, at step 912, the egress task memory interface updates the egress task queue that contained the transmitted packet, and the allocation counter associated with the received packet is decremented. Processing then terminates at step 914.

In another embodiment of the present invention, the ACL tables of the various switch engines are stored in the multiport memory instead of in the switch engine's local memory.

In another embodiment of the present invention, bridging tables are stored locally in each switch engine 604.

Although described in the context of switch 600 of FIG. 6 having a single multiport memory device 620 for storing the different sets of data shown in FIG. 6, embodiments of the present invention are not so limited and can be applied to a switch having two or more memory devices for storing those different sets of data.

Although described in the context of the Ethernet datalink protocol, embodiments of the present invention are not so limited and can be applied to any similar packet-based networking protocol.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A packet switch comprising:
two or more switch engines;
two or more sets of one or more input/output (I/O) ports, each set of I/O ports connected to and associated with a corresponding switch engine;
one or more shared memory devices connected to the two or more switch engines and configured to store:
egress task data for two or more sets of one or more egress task queues, each set of egress task queues associated with a corresponding switch engine; and
packet data for packets received at the I/O ports and processed by the switch engines, wherein:
the two or more switch engines are configured to process packets in parallel;
each switch engine performs (i) bridging of received packets using bridging logic local to the switch engine and (ii) scheduling of received packets for transmission using scheduling logic local to the switch engine;
the one or more shared memory devices are configured to store a shared bridging table accessed by each switch engine to perform the bridging; and
each switch engine is further configured to perform access-control-list (ACL) filtering comprising consulting an ACL table and rendering a decision whether to mirror a received packet.

2. The packet switch of claim 1, wherein the processing of packets by each switch engine is independent of the processing of packets by each other switch engine.

3. The packet switch of claim 1, wherein the one or more shared memory devices are a single multiport memory device.

4. The packet switch of claim 1, wherein the packet data for each of the received packets is stored in a shared packet buffer in the one or more shared memory devices.

5. The packet switch of claim 1, further comprising a memory manager connected to control writing data to and reading data from the one or more shared memory devices.

6. The packet switch of claim 1, wherein each switch engine performs bridging using a bridging table local to the switch engine.

7. The packet switch of claim 1, wherein each switch engine further performs background aging of records in a bridging table.

8. The packet switch of claim 1, Wherein each switch engine performs the ACL filtering of received packets using ACL logic local to the switch engine.

9. The packet switch of claim 8, wherein the one or more shared memory devices store a shared ACL table accessed by each switch engine to perform the ACL filtering.

10. The packet switch of claim 8, wherein each switch engine performs the ACL filtering using an ACL table local to the switch engine.

11. The packet switch of claim 1, wherein the two or more switches communicate with each other via an engine communication ring.

12. The packet switch of claim 1, wherein:
a first switch engine is configured to receive a received packet from one of its I/O ports and process the received packet for storage in the one or more shared memory devices; and
a second switch engine, different from the first switch engine, is configured to retrieve the received packet from the one or more shared memory devices and transmit the received packet via one of its I/O ports.

13. The packet switch of claim 1, wherein:
the processing of packets by each switch engine is independent of the processing of packets by each other switch engine;
the one or more shared memory devices are a single multiport memory device;
the packet data for the received packets is stored in a shared packet buffer in the multiport memory device;
the packet switch further comprises a memory manager connected to control writing data to and reading data from the multiport memory device;
each switch engine further performs the ACL filtering of received packets using ACL logic local to the switch engine;
the multiport memory device stores a shared ACL table accessed by each switch engine to perform the ACL filtering;
the two or more switches communicate with each other via an engine communication ring;
a first switch engine is configured to receive a received packet from one of its I/O ports and process the received packet for storage in the multiport memory device; and
a second switch engine, different from the first switch engine, is configured to retrieve the received packet from the multiport memory device and transmit the received packet via one of its I/O ports.

14. The packet switch of claim 1, wherein each switch engine is configured to perform background aging of only a subset of the records in the shared bridging table.

15. A communications system having a plurality of interconnected packet switches, at least one packet switch comprising:
two or more switch engines;
two or more sets of one or more input/output (I/O) ports, each set of I/O ports connected to and associated with a corresponding switch engine;
one or more shared memory devices connected to the two or more switch engines and configured to store:
egress task data for two or more sets of one or more egress task queues, each set of egress task queues associated with a corresponding switch engine; and
packet data for packets received at the I/O ports and processed by the switch engines, wherein:
the two or more switch engines are configured to process packets in parallel;
each switch engine performs (i) bridging of received packets using bridging logic local to the switch engine and (ii) scheduling of received packets for transmission using scheduling logic local to the switch engine;
the one or more shared memory devices are configured to store a shared bridging table accessed by each switch engine to perform the bridging; and
each switch engine is further configured to perform access-control-list (ACL) filtering comprising consulting an ACL table and rendering a decision whether to mirror a received packet.

16. The communication system of claim 15, wherein:
the processing of packets by each switch engine is independent of the processing of packets by each other switch engine;
the one or more shared memory devices are a single multiport memory device;
the packet data for the received packets is stored in a shared packet buffer in the multiport memory device;
the packet switch further comprises a memory manager connected to control writing data to and reading data from the multiport memory device;
each switch engine further performs the ACL filtering of received packets using ACL logic local to the switch engine;
the multiport memory device stores a shared ACL table accessed by each switch engine to perform the ACL filtering;
the two or more switches communicate with each other via an engine communication ring;
a first switch engine is configured to receive a received packet from one of its I/O ports and process the received packet for storage in the multiport memory device; and
a second switch engine, different from the first switch engine, is configured to retrieve the received packet from the multiport memory device and transmit the received packet via one of its I/O ports.

* * * * *